United States Patent
Lee et al.

(10) Patent No.: US 12,361,275 B2
(45) Date of Patent: Jul. 15, 2025

(54) NEURAL NETWORK DEVICE, OPERATION METHOD THEREOF, AND NEURAL NETWORK SYSTEM INCLUDING THE SAME

(71) Applicant: SAMSUNG ELECTRONICS CO., LTD., Suwon-si (KR)

(72) Inventors: Changgwun Lee, Hwaseong-si (KR); Kyoungyoung Kim, Suwon-si (KR); Byeoungsu Kim, Hwaseong-si (KR); Jaegon Kim, Hwaseong-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 762 days.

(21) Appl. No.: 17/033,054

(22) Filed: Sep. 25, 2020

(65) Prior Publication Data

US 2021/0174203 A1    Jun. 10, 2021

(30) Foreign Application Priority Data

Dec. 10, 2019    (KR) .......................... 10-2019-0163981

(51) Int. Cl.
*G06N 3/08*    (2023.01)

(52) U.S. Cl.
CPC ...................................... *G06N 3/08* (2013.01)

(58) Field of Classification Search
CPC ...................................................... G06N 3/08
See application file for complete search history.

(56) References Cited

U.S. PATENT DOCUMENTS

| 10,169,680 B1* | 1/2019 | Sachdeva ............. G06F 3/04842 |
| 2017/0024641 A1 | 1/2017 | Wierzynski |
| 2018/0024708 A1* | 1/2018 | Kim ........................ G06F 40/166 |
| | | 715/268 |

(Continued)

FOREIGN PATENT DOCUMENTS

| KR | 10-1750017 | 6/2017 | |
| WO | WO-2012000650 A1 * | 1/2012 | ........... B23K 1/0056 |

OTHER PUBLICATIONS

Li, G., et al., Sensor Data-Driven Bearing Fault Diagnosis Based on Deep Convolutional Neural Networks and S-Transform, [ received Jun. 23, 2023]. Retrieved from Internet:<https://www.mdpi.com/1424-8220/19/12/2750> (Year: 2019).*

(Continued)

*Primary Examiner* — Miranda M Huang
*Assistant Examiner* — Bart I Rylander
(74) *Attorney, Agent, or Firm* — MORGAN, LEWIS & BOCKIUS LLP

(57) ABSTRACT

The inventive concept relates to a neural network device, an operation method of the neural network device, and a neural network system including the neural network device, the operation method of the neural network device includes, receiving raw data from a sensor, converting the raw data to a feature map suitable for a first hidden layer among a plurality of hidden layers of a target neural network using a sensor response network adaptively trained to the sensor, inputting the feature map to the first hidden layer of the target neural network, and driving the neural network on a basis of the feature map.

18 Claims, 15 Drawing Sheets

(56) References Cited

U.S. PATENT DOCUMENTS

| | | | |
|---|---|---|---|
| 2018/0130186 A1 | 5/2018 | Romanenko | |
| 2018/0189229 A1 | 7/2018 | Desoli et al. | |
| 2019/0043178 A1* | 2/2019 | Chen | G06T 5/40 |
| 2019/0188586 A1 | 6/2019 | Rajabizadeh et al. | |
| 2019/0213761 A1 | 7/2019 | Rosen et al. | |

OTHER PUBLICATIONS

Hwangbo, J., et al., Control of a Quadrotor with Reinforcement Learning, [received Jun. 26, 2023]. Retrieved from Internet:<https://ieeexplore.ieee.org/abstract/document/7961277> (Year: 2017).*

Wersborg, I., et al., Multiple Sensors and Artificial Neural Networks in a Cognitive Technical System for Laser Welding, [received Jun. 26, 2023]. Retrieved from Internet:<https://ieeexplore.ieee.org/abstract/document/5416755> (Year: 2009).*

Tech Target Contributor, parallel processing, [received Jun. 26, 2023]. Retrieved from Internet: <https://www.techtarget.com/searchdatacenter/definition/parallel-processing#:~:text=There%20are%20multiple%20types%20of,each%20processor%20handles%20different%20data.> (Year: 2016).*

Tai, L., et al., Mobile robots exploration through cnn-based reinforcement learning, [received on Mar. 13, 2024]. Retrieved from Internet: <https://link.springer.com/article/10.1186/s40638-016-0055-x> (Year: 2016).*

Wu, Z., et al., BlockDrop: Dynamic Inference Paths in Residual Networks, [received Jul. 5, 2024]. Retrieved from Internet:<https://openaccess.thecvf.com/content_cvpr_2018/html/Wu_BlockDrop_Dynamic_Inference_CVPR_2018_paper.html> (Year: 2018).*

Byers, C., et al., 3D Data Visualization: The Advantages of vol. Graphics and Big Data to Support Geologic Interpretation, [received Nov. 8, 2024]. Retrieved from Internet:<https://library.seg.org/doi/abs/10.1190/INT-2014-0257.1> (Year: 2015).*

Ma, S., et al., SmartEye: Assisting Instant Photo Taking via Integrating User Preference with Deep View Proposal, [received Nov. 8, 2024]. Retrieved from Internet:<https://dl.acm.org/doi/abs/10.1145/3290605.3300701> (Year: 2019).*

* cited by examiner

NEURAL NETWORK DEVICE, OPERATION METHOD THEREOF, AND NEURAL NETWORK SYSTEM INCLUDING THE SAME

CROSS-REFERENCE TO RELATED APPLICATION

This U.S. non-provisional patent application claims the benefit of priority under 35 U.S.C. § 119 to Korean Patent Application No. 10-2019-0163981, filed on Dec. 10, 2019, in the Korean Intellectual Property Office, the disclosure of which is incorporated by reference in its entirety herein.

BACKGROUND

1. Technical Field

The inventive concept relates to a neural network device for performing a neural network computation, an operation method thereof, and a neural network system including the same, and more particularly, to a neural network device for converting data from a sensor to data suitable for driving a neural network, an operation method, and a neural network system including the same.

2. Discussion of Related Art

Artificial neural networks are computing systems that model biological brains. Such systems learn to perform tasks by considering example, generally without being programmed with task specific rules. An artificial neural network can be used to analyze input data received from sensors to extract valid information. When data input to an artificial neural network differs from data sets used to train the artificial neural network, the accuracy of processing results from the neural network may be reduced. Thus, technologies are required to improve this accuracy.

SUMMARY

At least one embodiment of the inventive concept provides a neural network device that efficiently processes input data generated from a sensor to reduce the amount of computations and enhance processing speed and accuracy, an operation method thereof, and a neural network system including the same.

According to an exemplary embodiment of the inventive concept, there is provided an operation method of a neural network device including receiving raw data from a sensor, converting the raw data to a features suitable for a first hidden layer among a plurality of hidden layers of a target neural network using a sensor response network adaptively trained to the sensor, inputting the features to the first hidden layer of the target neural network, and driving the neural network on a basis of the feature map. For example, the driving of the neural network may include executing the neural network after the features have been input to the first hidden layer.

According to an exemplary embodiment of the inventive concept, there is provided a neural network device including a memory configured to store at least one program and a processor. The processor is configured to receive raw data from a sensor, execute the at least one program to perform operations of a sensor response network trained adaptively to the sensor, convert the raw data to a feature map to be input to a hidden layer among a plurality of layers of a target neural network, and perform operations of the target neural network using the feature map to generate a neural network processing result.

According to an exemplary embodiment of the inventive concept, there is provided a neural network system including an image sensor, an image signal processor, a neural network device, and a display. The image sensor is configured to generate a Bayer pattern on a basis of a received optical signal. The image signal processor is configured to convert the Bayer pattern received from the image sensor to red-green-blue (RGB) data. The neural network device is configured to selectively drive a sensor response network and a target neural network on a basis of the Bayer pattern, or to drive the target neural network on a basis of the RGB data. The display is configured to display an image using the RGB data.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Hereinafter, exemplary embodiments of the inventive concept will be described in detail with reference to the accompanying drawings.

Figure 1:
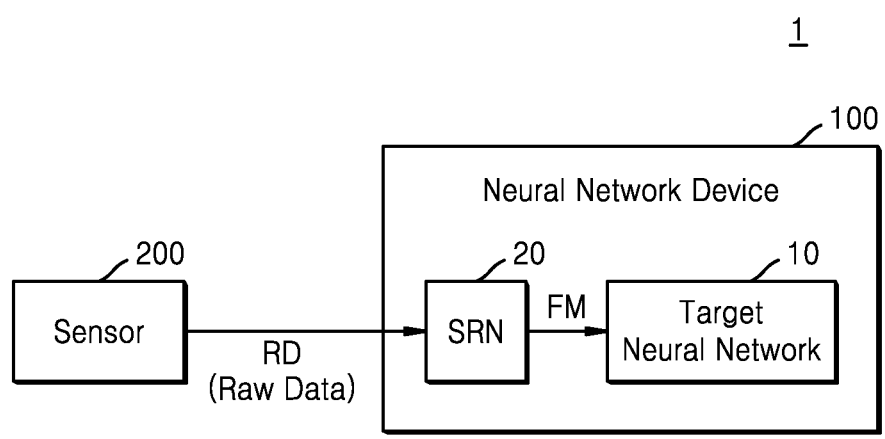
FIG. 1 shows a neural network device according to an exemplary embodiment of the inventive concept, and a neural network system including the same.

FIG. 1 shows a neural network device according to an exemplary embodiment of the inventive concept, and a neural network system including the same.

A neural network system 1 may analyze input data on the basis of a neural network to extract valid information, determine surrounding circumstances on the basis of the extracted valid information, or control components of an electronic device mounted on the neural network system 1. For example, the neural network system 1 may be applied to a drone, an advanced driver-assistance system (ADAS), a smart TV, a smartphone, a medical device, a mobile device, an image display device, a measurement device, an Internet of Things (IoT) device, or the like, and may be mounted in one of other various kinds of electronic devices.

The neural network system 1 includes a neural network device 100 and a sensor 200. Besides the above, the neural network system 1 may further include other universal components selected from among a memory, a communication module, a video module (e.g., a camera interface, a Joint Photographic Experts Group (a JPEG) processor, a video processor, a mixer, or the like), a 3D graphic core, an audio system, a display driver, a Graphics Processing Unit (GPU), or a Digital signal Processor.

The sensor 200 may sense a surrounding physical signal to generate sensing data. The sensor 200 may be implemented with at least one among various kinds of sensors including an image-capturing device, an image sensor, a light detection and ranging (LIDAR) sensor, an ultrasonic wave sensor, a depth sensor, and an infrared ray sensor.

The sensor 200 may include a sensing core (e.g., a sensing array composed of sensing elements for receiving a physical signal) and a readout circuit (or a peripheral circuit) for processing a signal received from the sensing core to output sensing data. The sensor 200 may output raw data RD for which a process including a change in the data format for the sensing data is not performed. In an exemplary embodiment, the sensor 200 senses a surrounding physical signal, generates the raw data RD from the sensed signal, and either processes the raw data RD to generate the sensing data or outputs the raw data RD. The raw data RD may reflect the unique characteristics of the sensor 200, for example, the physical characteristics of the sensing core or a data pattern of the sensing data. For example, when the sensor 200 is an image sensor, an image of a Bayer pattern (e.g., a Bayer pattern image) may be output as the raw data RD. For example, the Bayer pattern image may include values of an arrangement of four neighboring pixels of an image sensor such as two green pixels, a red pixel, and a blue pixel.

The neural network device 100 may generate a neural network, train the neural network or cause the neural network to learn, perform computations of the neural network on the basis of received input data, generate an information signal on the basis of the computation result, and retrain the neural network. In an exemplary embodiment, the neural network device 100 includes a hardware accelerator for executing the neural network. The hardware accelerator may correspond to, for example, a neural processing unit (NPU) that is a dedicated module for executing the neural network, a Tensor Processing Unit (TPU), or a neural engine, but is not limited thereto.

The neural network device 100 according to an exemplary embodiment of the inventive concept executes a target neural network 10 and a sensor response network (SRN) 20. A target neural network NN indicates a deep learning module that is trained and performs a certain target operation including image classification, image division, etc. The target neural network 10 may be a neural network model used for the network system to extract an intended information signal. For example, a target neural network may include at least one among various kinds of neural network models including a Convolution Neural Network (CNN), a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a Deconvolution Network, a Deep Belief Network (DBN), a Restricted Boltzmann Machine (RBM), a Fully Convolutional Network, a Long Short-Term Memory (LSTM) Network, and a Classification Network.

The target neural network 10 may be generated and trained by a training device (e.g., a server or the like that trains a neural network on the basis of a large amount of input data), and the target neural network 10, which is trained, may be executed in the neural network device 100. In an exemplary embodiment of the inventive concept, the target neural network 10 indicates a neural network in which configuration parameters (e.g., a network topology, biases, weights, and the like) are determined through training. The configuration parameters of the target neural network 10 may be updated through retraining in the training device, and the updated target neural network NN may be applied to the neural network device 100. For example, the initial target neural network NN could be replaced with the updated target neural network NN.

In an exemplary embodiment, the SRN 20 generates a feature map FM for the target neural network 10 based on raw data RD received from the sensor 200. The feature map FM generated in the SRN 20 may be provided as an input feature map to an intermediate layer (e.g., a hidden layer of a plurality of layers) of the target neural network 10. The SRN 20 may be generated through training adaptive to the sensor 200.

In an exemplary embodiment, the SRN 20 is generated by performing reinforcement learning based on unique parameters of the sensor 200. Here, the unique parameters of the sensor 200 may include at least one among a pattern of the raw data RD, the physical characteristics of the sensor 200, and information about the type of the sensor 200. When the sensor 200 is an image sensor, the physical characteristics of the sensor 200 may include the focal length of a lens provided in the sensor 200, a degree of lens distortion, an inter-pixel pitch of a sensing array, a sensor dynamic range, etc. The information indicating the type of the sensor 200 may include information indicating whether the sensor 200 is a depth sensor, an infrared sensor, or an ultrasonic sensor.

When the sensor 200 is an image sensor, the raw data RD may have a data pattern including an RGB pattern, an RGBG pattern, and RGBW pattern, or the like, according to the type of a sensing array provided in the sensor 200. Here, the RGB pattern indicates a pattern having a structure in which red, green, and blue pixel values are repeated. The RGBG pattern indicates a pattern having a structure in which red, green, blue, and green pixel values are repeated, and the RGBW pattern indicates a pattern having a structure in which red, green, blue, and white pixel values are repeated. For example, an RGB pattern could include one green pixel value corresponding to a green pixel of the sensor 200, one red pixel value corresponding to a red pixel of the sensor 200, and one blue pixel value corresponding to a blue pixel of the sensor 200, where the pixels could be arranged to neighbor one another. For example, an RGBG pattern could include two green pixel values corresponding to first and second green pixels of the sensor 200, one red pixel value corresponding to a red pixel of the sensor 200, and one blue pixel value corresponding to a blue pixel of the sensor 200, where the pixels could be arranged to neighbor one another. For example, an RGBW pattern could include one green pixel value corresponding to a green pixel of the sensor 200, one red pixel value corresponding to a red pixel of the sensor 200, one blue pixel value corresponding to a blue pixel of the sensor 200, and one white pixel value corresponding to a white pixel of the sensor 200, where the pixels could be arranged to neighbor one another.

For example, the SRN 20 may be generated adaptively through reinforcement learning on the basis of the unique parameters of the sensor 200. The SRN 20 may be generated in and applied to the neural network device 100, or may be generated in a training device (e.g., a server) to be applied to the neural network device 100.

Figure 2:
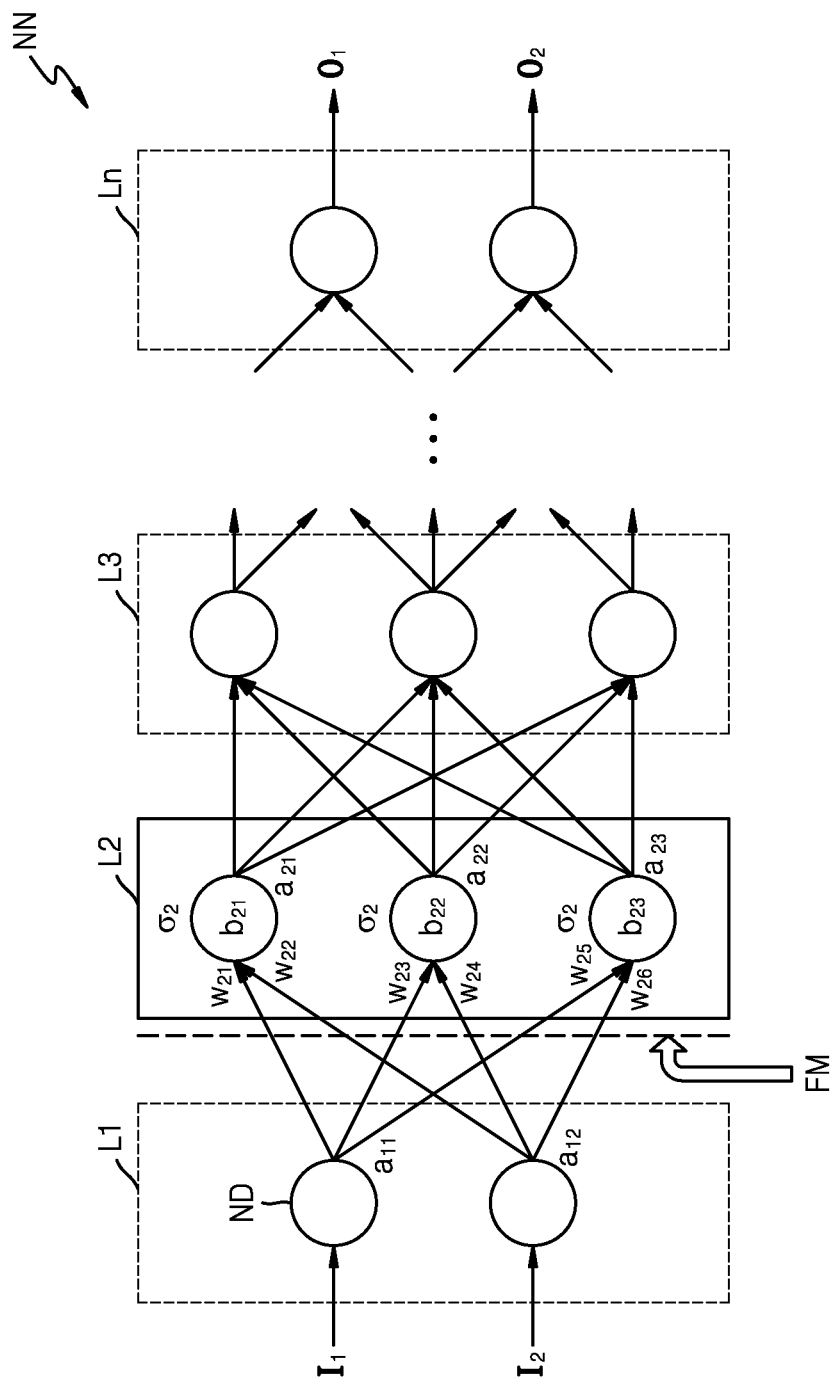
FIG. 2 explains an operation of a neural network device according to an exemplary embodiment of the inventive concept.

FIG. 2 exemplarily shows the structure of a neural network executable in a neural network device according to an exemplary embodiment of the inventive concept.

Referring to FIG. 2, the neural network NN has the structure including an input layer L1, hidden layers L2, L3, . . . or the like, and an output layer Ln (where n is a natural number of 3 or greater). The neural network NN performs a computation based on received input data (e.g., $I_1$ and $I_2$) to generate output data (e.g., $O_1$ and $O_2$).

The neural network NN may be a deep neural network (DNN) or an N-layered neural network including one or more hidden layers. For example, as shown in FIG. 2, the neural network NN may be a DNN including the input layer L1, the hidden layers L2 and L3, and the output layer Ln. The DNN may include a Convolutional Neural Network (CNN), an RNN, a DBN, an RBM, or the like, but is not limited thereto.

In the case of a DNN structure, the neural network NN has many layers through which effective information may be extracted, whereby more complex data sets than an existing neural network may be processed. The neural network NN may also include layers having various structures other than the shown in FIG. 2.

Each of the layers L1 to Ln included in the neural network NN may include a plurality of artificial nodes known as a "neuron", a "processing element", a "unit", or other terms similar thereto. For example, as shown in FIG. 1, the input layer L1 may include two nodes ND, and the hidden layers L2 and L3 may include three nodes ND. However, the above description is just exemplary, and each of the layers included in the neural network NN may include various numbers of nodes ND.

Nodes included in each of the layers of the neural network may be connected to each other to exchange data. For example, one node ND may receive data from other nodes ND to perform computations and output the computation result to other nodes ND.

An input and output of each of the nodes ND may be referred to as an activation. The activation may be an output value of one node ND and an input value of the nodes ND included in a next layer. Moreover, each of the nodes ND may determine its own activation on the basis of weights and activations received from the nodes ND included in a previous layer. The weight is a network parameter to be used for computing the activation of each node ND and may be a value to be allocated to a connection relation between nodes. For example, in a second layer L2, the nodes ND may determine their own activations on the basis of activations $(a_{11}, a_{12})$, weights $(w_{21}, w_{22}, w_{23}, w_{24}, w_{25}, w_{26})$, and biases $(b_{21}, b_{22}, b_{23})$.

Each of nodes ND may be a computational unit for receiving an input and outputting the activation and may map the input to the output. For example, σ2 is an activation function of the second layer L2 and the activation $a_{21}$ may satisfy the following Equation 1.

[Equation 1]

$$a_{21} = \sigma 2 \times ((a_{11} \times w_{21} + a_{12} \times w_{22}) + b_{21}) \quad (1)$$

However, Equation (1) is an example for explaining the activation and weights used for processing data in a neural network, and the inventive concept is not limited thereto. The activation may be a value acquired by applying an activation function to a weighted sum of activations received from the previous layer and by passing the value through a Rectified Linear Unit (ReLU). In an exemplary embodiment, the ReLU sets the value to 0 when the value is negative and otherwise leaves the value unchanged.

Referring to FIG. 1, the neural network NN may be applied as the target neural network 10 of FIG. 1, and the neural network device 100 uses the sensor response network 20 to generate a feature map FM, and provides the feature map FM to one layer of the plurality of layers L1 to Ln of the neural network NN.

For example, the feature map FM may be provided to the second layer L2 in the neural network NN of FIG. 2. The neural network device 100 may apply the received raw data RD to the sensor response network 20 to generate the feature map FM, execute the target network 10, for example, the second layer L2 and the succeeding layers L3 to Ln of the neural network NN of FIG. 2 on the basis of the feature map FM, and generate output data (e.g., $O_1$ and $O_2$), namely, a result. In other words, referring to FIG. 2, a first layer L1 and a second layer L2 of the neural network NN, for example, the target neural network 10, may be cut off (see dotted line in FIG. 2), and the sensor response network 20 may be joined to a forward stage of the second layer L2. In FIG. 2, connections between the first layer L1 and the second layer L2, in other words, branches between the first layer L1 and the second layer L2, are exemplarily shown as cut off, but the inventive concept is not limited thereto, and a branch cut off from the target neural network 10 may be changed. In the embodiment, a branch cut off from the target neural network 10 may be determined in the reinforcement learning phase for generating the sensor response network 20. In an exemplary embodiment, the sensor 200 outputs processed data as inputs (e.g., $I_1$ and $I_2$) to the first layer L1 and the first layer L1 is connected to the second layer L2 during a first mode; and the sensor 200 outputs raw data RD to the SRN 20, the first layer L1 is disconnected from the second layer L2, and the SRN 20 outputs a feature map FM based on the raw data RD to the second layer L2 during a second mode.

Figure 3A:
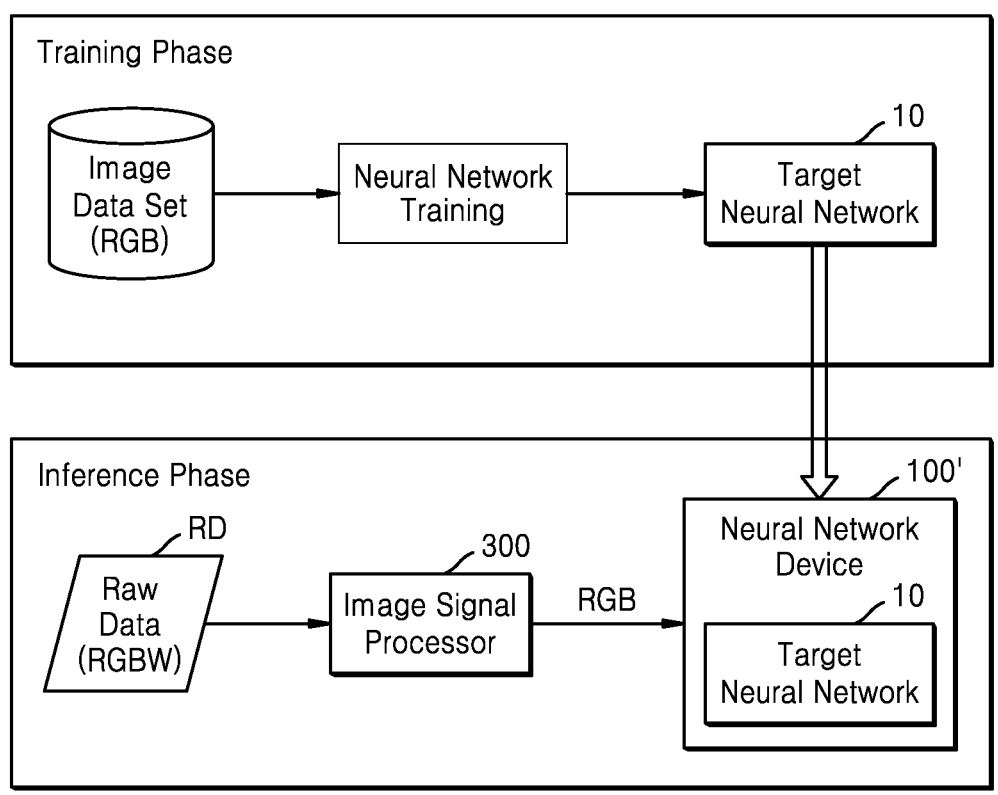
FIG. 3A shows an operation according to a comparative example of a neural network device according to an exemplary embodiment of the inventive concept.
Figure 3B:
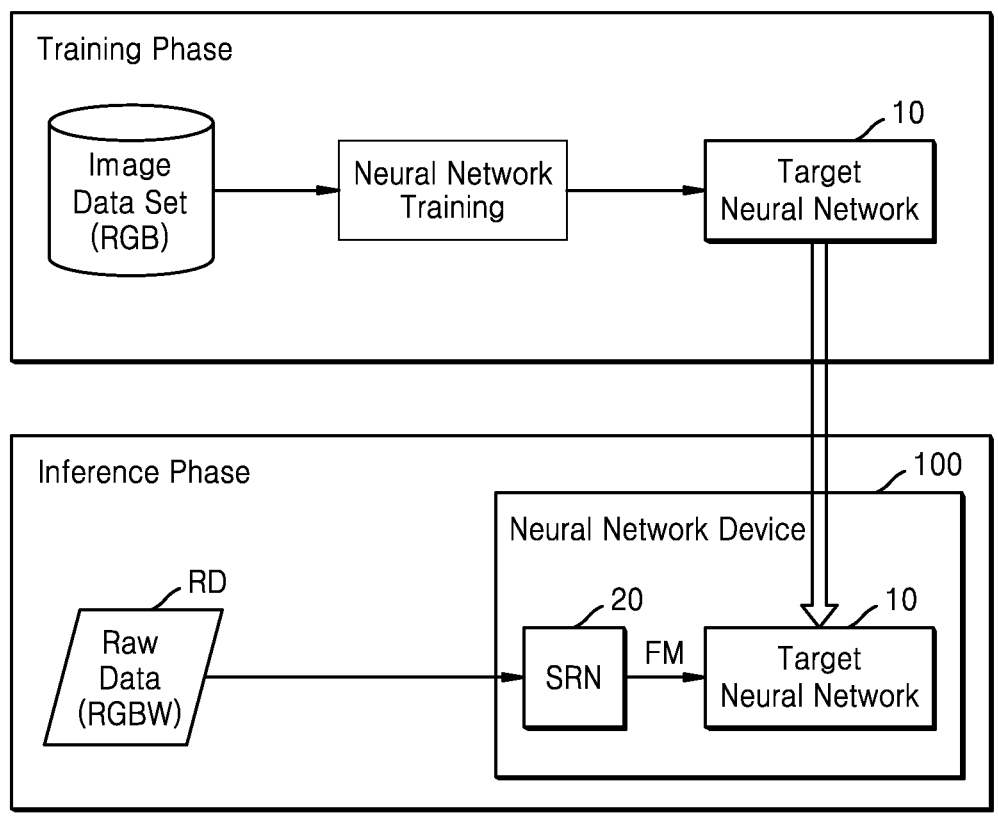
FIG. 3B shows an operation of a neural network device according to an exemplary embodiment of the inventive concept.

FIG. 3A shows an operation according to a comparative example of a neural network device according to an exemplary embodiment of the inventive concept, and FIG. 3B shows an operation of a neural network device according to an exemplary embodiment of the inventive concept. It is assumed that the target neural network 10 processes image data.

Referring to FIG. 3A, in the training phase, neural network training is performed based on an image data set, and the target neural network 10 is generated based on the training. In other words, the target neural network 10 may be trained on a large number of image data sets to determine network parameters of the target neural network 10. For example, the network parameters may include the network topology (the number of nodes ND and connection relationships between the nodes ND), weights of each layer, an activation function, a bias, and the like. Here, the target neural network 10 may be trained on the basis of the image data set of an RGB data pattern.

The target neural network 10, which has been determined in the training phase, may be applied to a neural network device 100' according to a comparison example, and, in an inference phase, the neural network device 100' may execute the target neural network 10. However, the raw data RD generated in the sensor 200 (in FIG. 1) has an RGBW data pattern and is different from the image data set used for training the target neural network 10 in the training phase. Accordingly, when the raw data RD is provided as an input to the target neural network 10 without a change, an accurate result may not be output from the target neural network 10. Therefore, a pre-processing for the raw data RD is required. An image signal processor 300 may convert the raw data RD to RGB data through image processing on the raw data RD. The neural network device 100' may execute the target neural network 10 on the basis of the RGB data (e.g., an RGB image) provided from the image signal processor 300. The neural network 100' may process the RGB data to convert the RGB data to a data type (e.g., a feature map) that may be processed in the target neural network 10, and execute the target neural network 10 based on the converted data. In this way, according to various kinds of pre-processing for the raw data RD, a processing speed of a system including the neural network device 100' may be reduced, and power consumption may increase. In addition, since the raw data RD different from the image data set used in the training phase of the target neural network 10 is used, the accuracy of results of the target neural network 10 may decrease.

Referring to FIG. 3B, in the training phase, the neural network training may be performed on the basis of an image data set, and the target neural network 10 is generated based on the training.

The target neural network 10 may be applied to a neural network device 100 according to an exemplary embodiment of the inventive concept, and, in an inference phase, the neural network device 100 may execute the target neural network 10. The neural network device 100 converts the raw data RD of an RGBW data pattern generated in the sensor 200 (of FIG. 1) to a feature map FM using the sensor response network 20 that has been generated adaptively to the sensor 20 in the reinforcement learning manner. The feature map FM has a data type capable of being processed in the target neural network 10. The feature map FM is provided to one layer among a plurality of layers, for example, one of the hidden layers, of the target neural network 10. In an exemplary embodiment, the sensor response network 20 operates on raw data RD of a first pattern (e.g., RGBW data pattern) to generate raw data RD of a second pattern (e.g., an RGB data pattern) and outputs the raw data RD of the second pattern as the feature map FM or generates the feature map FM from the raw data of the second pattern.

According to an exemplary embodiment of the inventive concept, a separate processor (e.g., 300) for pre-processing the output of the sensor 200 (e.g., the raw data RD) is omitted, the neural network device 100 generates the feature map FM adaptively to the sensor 200 using the sensor response network 20, and the generated feature map FM is input to the target neural network 10. In an exemplary embodiment of the inventive concept, the neural network device 100 directly converts the raw data RD of the input stage to the feature map FM, and drives the target neural network 10 based on the feature map. Thus, the processing speed and the accuracy of processing results of a system including the neural network device 100 (e.g., the neural network system 1 of FIG. 1) may increase, and power consumption may decrease.

Figure 4:
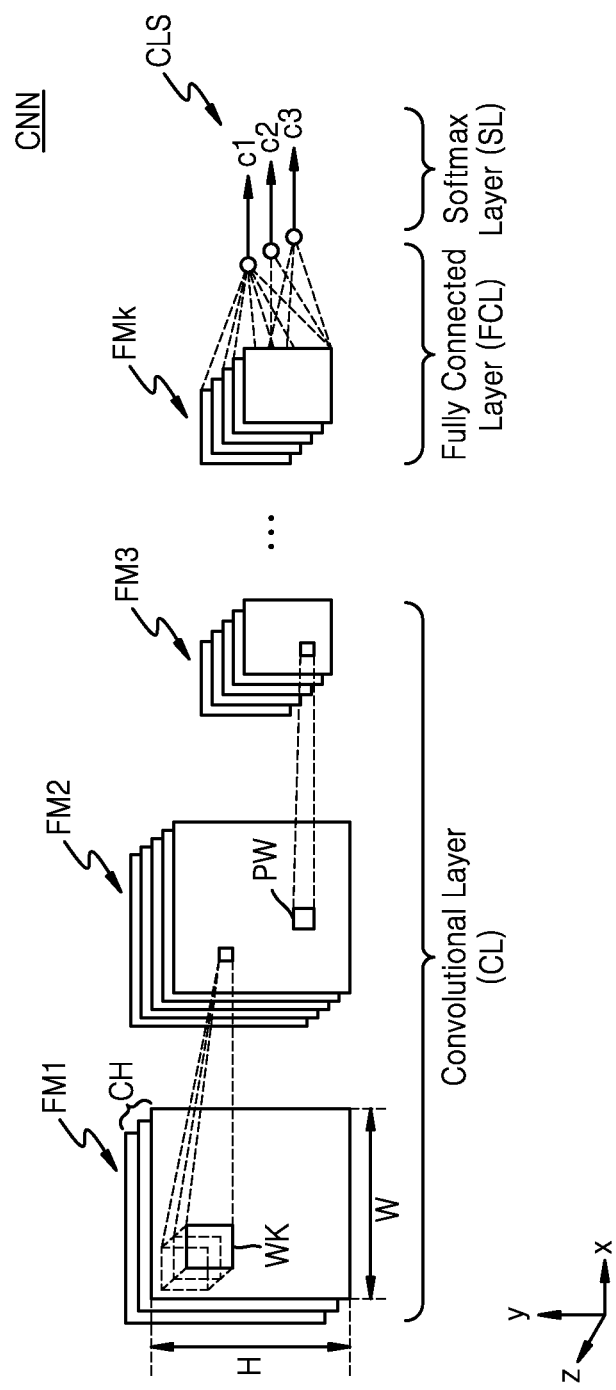
FIG. 4 exemplarily shows the structure of a neural network executable in a neural network device according to an exemplary embodiment of the inventive concept.

FIG. 4 exemplarily shows the structure of a CNN, as an example of a neural network structure.

The CNN may include a plurality of layers, for example, a convolutional layer CL, a fully-connected layer FCL, a softmax layer SL, and the like. The CNN may have the architecture of a deep neural network DNN or an n-layer neural network. A plurality of layers L1 to Ln may be implemented with the convolutional layer CL, the fully-connected layer FCL, the softmax layer SL, and the like. For example, the convolutional layer CL may include a convolution computation, a pooling computation, an activation function computation, or the like. In addition, the convolution computation, the pooling computation, and the activation function computation may respectively form layers.

A plurality of layers CL, FCL, SL and the like may receive, as an input feature map, a feature map generated in a preceding layer, and compute the input feature map to generate an output feature map or an output signal. In an exemplary embodiment, the CNN is a neural network for classification, and an output of the softmax layer SL may include classes CLS (e.g., first to third classes c1, c2, and c3).

The feature map indicates data in which various features of the input data are expressed. Each of the feature maps FM1, FM2, and FMk may include a two-dimensional matrix or three-dimensional matrix (or a tensor) structure. The feature maps FM1, FM2, and FMk may include at least one channel CH in which feature values are arrayed in rows and columns (matrix). When the feature maps FM1, FM2, FM3, . . . and FMk include a plurality of channels CH, the numbers of rows H and columns W of the plurality of channels CH may be identical to each other. Here, the rows H, the columns W, and the channels CH may respectively correspond to x, y, and z axes on a coordinate system. Feature values assigned to a certain row H and column W in the two-dimensional matrix of x axis and y axis directions (hereinafter, the matrix in the inventive concept indicates a two-dimensional matrix in x axis and y axis directions) may be referred to as an element of the matrix. For example, the structure of a 4×5 matrix may include 20 elements.

In the convolutional layer CL, a first feature map FM1 may be convoluted with a weight kernel WK to generate a second feature map FM2. In addition, the second feature map FM2 may be pooled down (sampled down or down-sampled) to generate a third feature map FM3. The weight kernel WK may be referred to as a filter or a weight map. The weight kernel WK may filter the first feature map FM1. The weight kernel WK has a similar structure to the feature map. The weight kernel WK includes at least one channel CH in which the weights are arrayed in rows and columns (matrix), and the number of channels CH is the same as that of the channels of a corresponding feature map, for example, the first feature map FM. The same channels CH of the weight kernel WK and the first feature map FM1 may be convoluted.

While the weight kernel WK is shifted on the first feature map FM1 in a sliding window manner, the weight kernel WK may be convoluted with windows (or tiles) of the first feature map FM1. During each shift, each weight included in the weight kernel WK may be multiplied and added with all the feature values in an area superimposed with the first feature map FM1. As the first feature map FM1 is convoluted with the weight kernel WK, one channel of the second feature map FM2 may be generated. One weight kernel WK is shown in FIG. 4, but a plurality of weight kernels WK are substantially convoluted with the first feature map FM1 to generate the second feature map FM2 including a plurality of channels.

The spatial size of the second feature map FM2 may be changed through pooling to generate the third feature map FM3. The pooling may be referred to as sampling or down-sampling. A two-dimensional pooling window PW is shifted by a size unit of a pooling window PW on the second feature map FM2, and top values (or an average value of feature data) may be selected from among the feature data in an area superimposed with the pooling window PW. Accordingly, the third feature map PM3 of which spatial size is changed from the second feature map FM2 may be generated. The third feature map FM2 has the same number of channels as the second feature map FM2.

The fully connected layers FCL may output a computation result indicating how likely that input data is to be classified into each class. In other words, the fully connected layers FCL may output a result value including how likely that the input data is to be classified into a corresponding class using a computation result for each class. In detail, the fully connected layer FCL may include nodes corresponding to respective classes, and each node of the fully connected layers FCL may output a result value for indicating how likely that the input data is to be classified into each class. For example, when the neural network is implemented for a classification work into three classes, each output value of first to third nodes of the fully connected layer FCL may represent the likelihood that the input data is to be classified into a first class c1 to a third class c3.

The fully connected layer FCL may output the computation results to the softmax layer SL, and the softmax layer SL may convert the computation results to probability values. The softmax layer SL may normalize the computation values indicating how likely that the input data is to be classified into each class CLS to generate the probability values. In an exemplary embodiment, the CNN may further include a loss layer, and the softmax layer SL may output the probability values to the loss layer. The loss layer 340 may compute a cross entropy loss that indicates an error in the computation result on the basis of the probability values y.

Referring to FIG. 4, some layers of the CNN are described which may be applied as the target neural network 10 (of FIG. 1) of the inventive concept. However, embodiments of the inventive concept are not limited thereto, and the configurations and operations of the layers included in the CNN may be variously changed.

Figure 5:
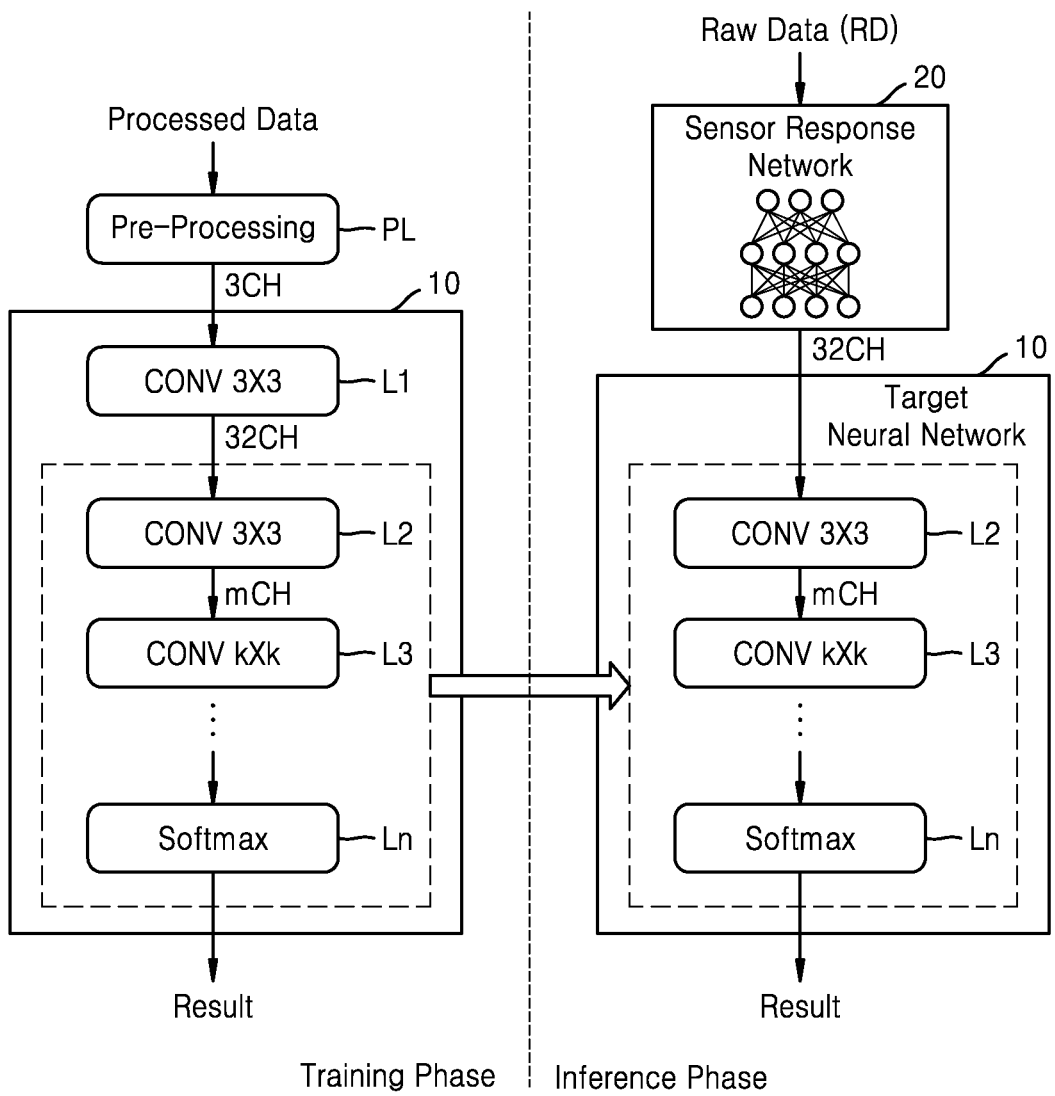
FIG. 5 explains an operation of a sensor response network according to an exemplary embodiment of the inventive concept.

FIG. 5 explains an operation of a sensor response network according to an exemplary embodiment of the inventive concept.

Referring to FIG. 5, the target neural network 10 is generated in the training phase, and include first to n-th layers L1 to Ln. For example, the first layer L1 and the second layer L2 may be respectively 3×3 convolutional layers, and the third layer may be a k×k convolutional layer (where k is a positive integer). The n-th layer Ln may be a softmax layer. Here, the 3×3 convolutional layer indicates a layer in which a convolution computation is performed on the basis of a weight kernel KN (of FIG. 4) having a matrix structure of 3 rows and 3 columns.

In the training phase, processed data (e.g., RGB data) is received, and a pre-processing unit PL divides the processed data into three channels (e.g., a red channel, a blue channel, and a green channel). An input having three channels 3CH is input to the first layer L1, and an output having 32 channels 32CH. For example, an output feature map may be output by performing a convolution computation in the first layer L1. For example, each channel may mean the feature map, and 32 output feature maps may be output from the first layer L1 and be input to the second layer L2. For example, m channels mCH (where m is a positive integer) are output from the second layer L2 and input to the third layer L3. In this way, the numbers of channels in layers may be different from each other.

The target neural network 10 generated in the training phase is executed in the inference phase. Here, as described with reference to FIGS. 1 to 3B, the sensor response network 20 converts the raw data RD to a feature map, and the feature map may be input to a hidden layer of the target neural network 10. In FIG. 5, an output from the sensor response network 200 (e.g., the feature map) may be applied to the second layer L2 of the target neural network 200. In the training phase, the second layer L2 has been determined to receive the 32 channels 32CH. Accordingly, the sensor response network 20 may generate 32 feature maps corresponding to the 32 channels 32CH to transmit the 32 feature maps to the second layer L2. The second layer L2 and the succeeding layers L3 to Ln may be executed among the plurality of layers L1 to Ln of the target neural network 10.

If the sensor response network 20 is connected to the third layer L3, in other words, when the output from the sensor response network 20, namely, the feature map is applied to the second layer L3, the sensor response network 20 may generate m feature maps corresponding to m channels mCH to transmit the m feature maps to the third layer L3.

As described above, the sensor response network 20 may be connected to one, for example, a hidden layer of the plurality layers L1 to Ln of the target neural network 10, and the sensor response network 20 may generate the feature maps corresponding to the number of channels of the hidden layer to provide the feature maps to the hidden layer. In the specification, the expression that the sensor response network 20 generates the feature maps may be understood as meaning that, as described with reference to FIG. 5, the sensor response network 20 generates the feature maps corresponding to the number of channels of the connected layer among the plurality of layers L1 to Ln of the target neural network 10.

Figure 6:
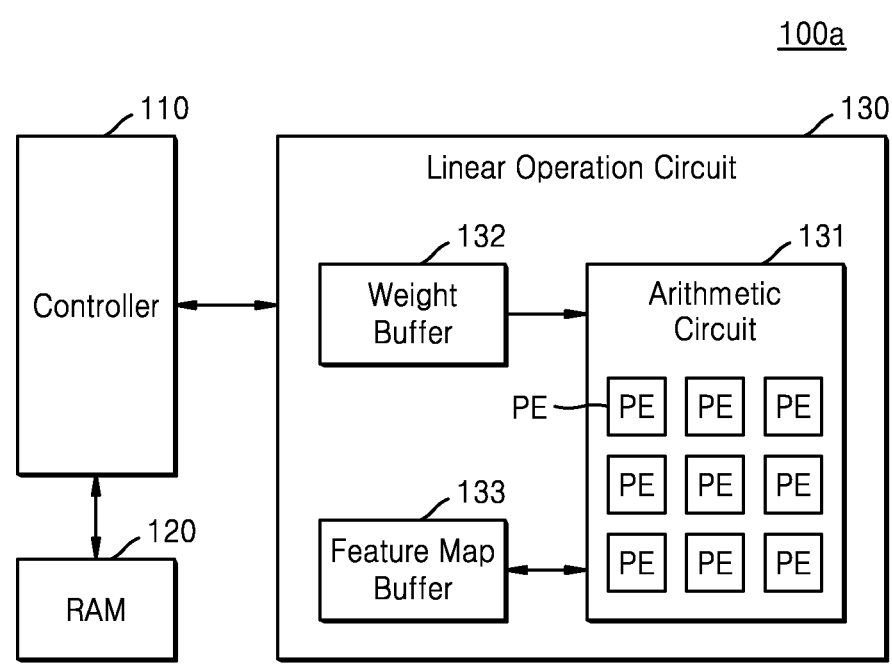
FIG. 6 is a block diagram showing an implementation example of a neural network device according to an exemplary embodiment of the inventive concept.

FIG. 6 is a block diagram showing an implementation example of a neural network device according to an exemplary embodiment of the inventive concept.

A neural network device 100a of FIG. 6 may correspond to the neural network device 100 of FIG. 1 and the description given with reference to FIG. 1 may be applied to the present embodiment.

The neural network device 100a includes a controller 110 (e.g., a control circuit), random access memory (RAM) 120, and a linear operation circuit 130. The linear operation circuit 130 includes an arithmetic circuit 131, a weight buffer 132, and a feature map buffer 133. In an embodiment, the neural network device 100a is implemented with one semiconductor chip, for example, a system on chip (SoC). However, exemplary embodiments of the inventive concept are not limited thereto, and the neural network device 100a may be implemented with a plurality of semiconductor chips.

The controller 110 may control the entire operation of the neural network device 100a. For example, the controller 110 may control operations of the arithmetic circuit 131, the weight buffer 132, and the feature map buffer 133 of the linear operation circuit 130. The controller 110 may perform a control so that the target neural network 10 (of FIG. 1) and the sensor response network 20 (of FIG. 1) are executed in the linear operation circuit 130. In an exemplary embodiment, the controller 110 controls the linear operation circuit 130 so that the reinforcement learning for generation of the sensor response network 20 is performed.

The controller 110 may be implemented with hardware, software (or firmware), or a combination of hardware and software. In an exemplary embodiment, the controller 110 is implemented with hardware logic designed to perform the above-described functions. In an exemplary embodiment, the controller 110 may be implemented with at least one processor, for example, a central processing unit (CPU), a microprocessor, or the like, and may execute at least one program loaded in the RAM 120. For example, the program may include instructions for performing the above-described functions.

The RAM 120 may be implemented with dynamic RAM, or static random access memory (SRAM), store various kinds of programs and data for the controller 110, and store data generated by the controller 110. In addition, the RAM 120 may store data output from the linear operation circuit 120. For example, the RAM 120 or the SRAM may store a result of the neural network or intermediate results such as the feature maps. The RAM 120 or the SRAM may store instructions for executing the target neural network 10 and the sensor response network 20, and store instructions for executing an agent for performing reinforcement learning of the sensor response network 20. For example, the agent could be a computer program that runs in the background.

The linear operation circuit 130 may perform various kinds of operations for forming an output feature map using an input feature map and weights. The arithmetic circuit 131 includes a plurality of processing elements PE, and each of the processing elements PE may be an arithmetic circuit that performs an arithmetic operation (e.g., multiplication, summation, inner product, etc.). The plurality of processing elements PE may operate simultaneously, substantially simultaneously, or in parallel.

The weight buffer 132 may store weights (or weight kernels) of each layer of the target neural network 10 and the sensor response network 20, and provide the weights corresponding to a layer to be executed to the arithmetic circuit 131. The weight buffer 132 may be implemented with RAM, for example, dynamic RAM (DRAM), SRAM, or the like.

The feature map buffer 133 may store the input feature maps or the output feature maps. The feature map buffer 133 may be implemented with RAM. In an exemplary embodiment, the feature map buffer 133 is a feature map buffer based on general matrix multiplication (GEMM). The feature map buffer 133 may provide, to the arithmetic circuit 131, a feature map corresponding to a layer being executed from among the feature maps stored in the feature map buffer 133. In addition, the feature map buffer 133 may receive and store feature maps output from the arithmetic circuit 131.

Figure 7:
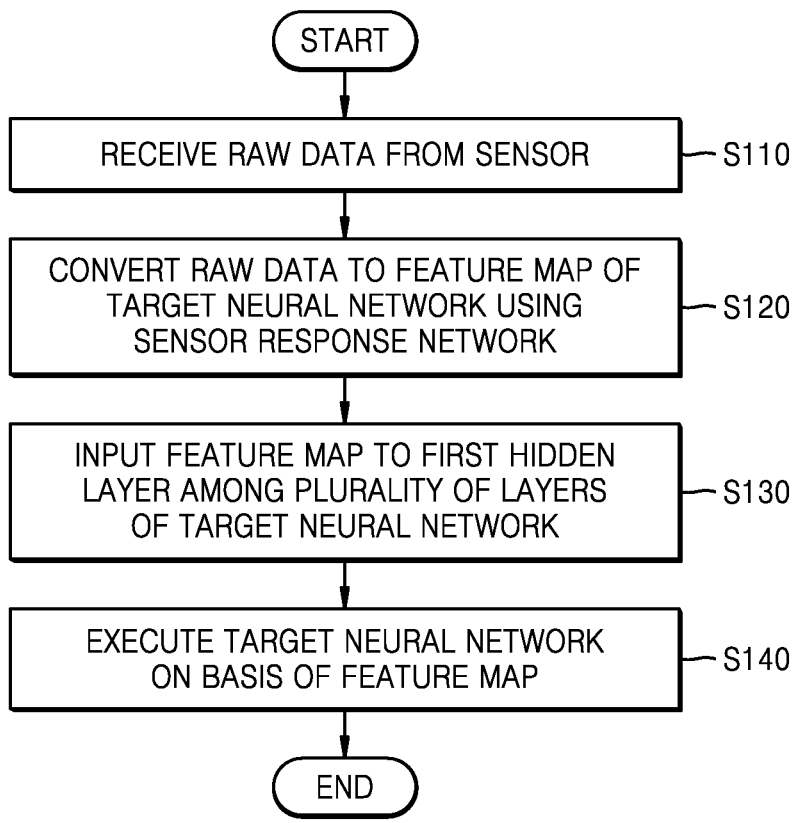
FIG. 7 is a flowchart showing an operation method of a neural network device according to an exemplary embodiment of the inventive concept.

FIG. 7 is a flowchart showing an operation method of a neural network device according to an exemplary embodiment of the inventive concept. The operation method of FIG. 7 may be executed in the neural network device 100 of FIG. 1. The description given with reference to FIG. 1 may be applied to the present embodiment.

With reference to FIGS. 1 and 7, the neural network device 100 receives raw data RD from the sensor 200 (operation S110). The neural network device 100 uses the sensor response network 20 to convert the raw data RD to the feature map of the target neural network 10 (S120). The neural network device 100 may convert the raw data RD to a feature map corresponding to one layer, for example, a first hidden layer, of the plurality of hidden layers (or intermediate layers) of the target neural network 10.

The neural network device 100 inputs the feature map to the first hidden layer among the plurality of layers of the target neural network 10 (S130). Here, the first hidden layer does not indicate a layer executed first among the plurality of hidden layers, but indicates one hidden layer among the plurality of hidden layers.

The neural network device 100 executes the target neural network on the basis of the feature map (operation S140). The neural network device 100 may execute the first hidden layer to which the feature map is input and layers of the target neural network 10 succeeding the first hidden layer.

Figure 8:
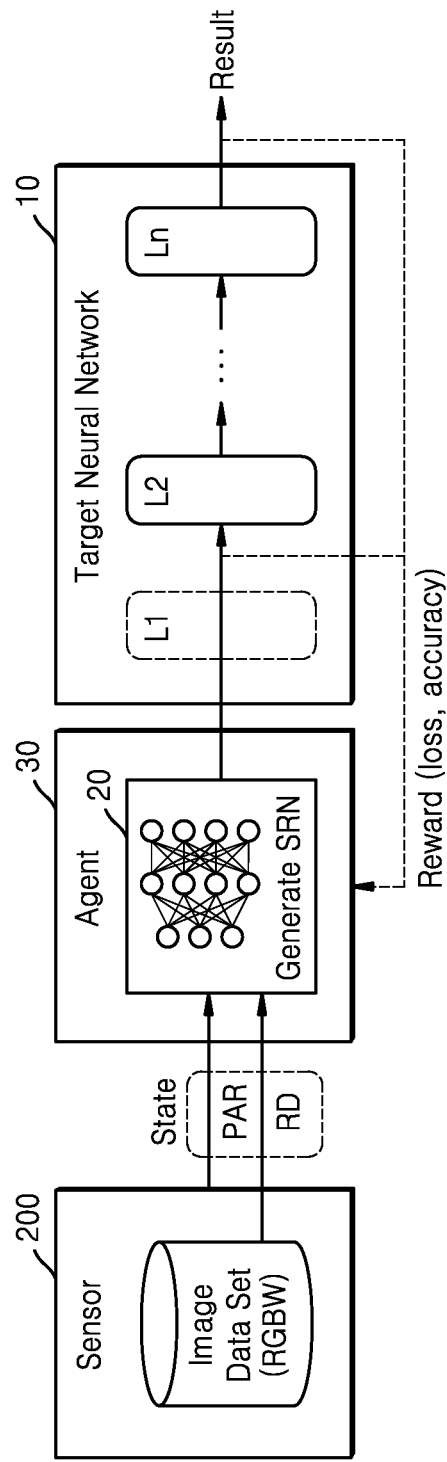
FIG. 8 shows a generation method of a sensor response network according to an exemplary embodiment of the inventive concept.

FIG. 8 shows a generation method of a sensor response network according to an exemplary embodiment of the inventive concept. The method of FIG. 8 shows a method of generating the sensor response network 20 through reinforcement learning, and the method of FIG. 8 may be performed in the neural network device 100 or a training device.

With reference to FIG. 8, an agent 30 generates the sensor response network 20 using a reinforcement learning manner. The agent 30 receives, as current states, an image data set including a pattern (e.g., an RGBW data pattern) of the output of the sensor 200, namely, the raw data RD of the sensor 200, unique parameters PAR of the sensor 200 (e.g., the physical characteristics of the sensor 200, information about the type of the sensor 200, etc.) and generate the sensor response network 20 on the basis thereof. As described with reference to FIG. 1, the physical characteristics of the sensor 200 may include the focal length of a lens provided in the sensor 200, a degree of lens distortion, an inter-pixel pitch of a sensing array, a dynamic range of the sensor, and the like.

In the reinforcement learning phase, the agent 30 generates the feature map using the sensor response network 20, executes the target neural network 10 on the basis of the feature map to generate a result, determines a reward imparted by the result, and adjusts the server response network 20 based on the reward. For example, the agent 30 may generate the sensor response network 20 to impart rewards in a direction to enhance the similarity on the basis of a loss in the feature map and in a direction to increase the accuracy of a result from the target neural network, and then repeatedly train the sensor response network 20. Here, the loss of the feature map represents the difference between the feature map generated in the sensor response network 20 and the feature map generated in the training phase of the target neural network. The agent 30 may perform reinforcement learning by adjusting the sensor response network 20 to impart the rewards in a direction in which the feature map generated in the sensor response network 20 becomes similar to the feature map generated in the training phase of the target neural network 10.

The sensor response network 20 may be trained in a direction to allow the rewards to increase through the reinforcement learning. The sensor response network 20 may be trained to adapt to the sensor 200 through the reinforcement learning of the agent 30. The sensor response network 20 is a kind of a neural network, and the network topology and network parameters (each bias, weight, and activation, etc., of a plurality of layers) may be determined by the agent 30.

In an exemplary embodiment, the agent 30 determines a layer of the target neural network 10, which is to be connected to the sensor response network 20 through reinforcement learning. In other words, the agent 30 determines a cutoff point (a point (layer) to which the sensor response network 20 is to be connected) of the target neural network 10. For example, the agent 30 may determine which layer of the target neural network 10 to output the feature map. The agent 30 may search branches, for example, a connection relationship between nodes of the target neural network 10, and determine a cutoff point at which the accuracy of the target neural network 10 increases. An optimal cutoff point may be determined through the reinforcement learning. For example, the agent 30 could determine during a first period that accuracy of the target neural network 10 increases when a feature map is provided from the SRN to the second layer L2, but that during a second period that the accuracy increases when a feature map is provided from the SRN to the first layer L1.

The agent 30 may be implemented with a program or software including code in which a hyper parameter (e.g., a regulation, a rule, or the like) of the reinforcement learning is defined. In an embodiment, the agent 30 may be stored in the memory of the neural network 100, for example, the RAM 120 of the neural network device 100*a*, in FIG. 6, and be executed by the controller 110 (in FIG. 6). In an exemplary embodiment, the neural network device 100 generates the sensor response network 20 by performing the reinforcement learning through the agent 30 as a background operation when the neural network system 1 (in FIG. 1) is in a sleep state. As another embodiment, the agent 30 is implemented in a training device, for example, a server, and the reinforcement learning is performed by the agent 30 in the server to generate the sensor response network 20. The sensor response network 20, which is generated, in other words, the sensor response network 20 adaptively trained to the sensor may be applied to the neural network device 100.

Figure 9:
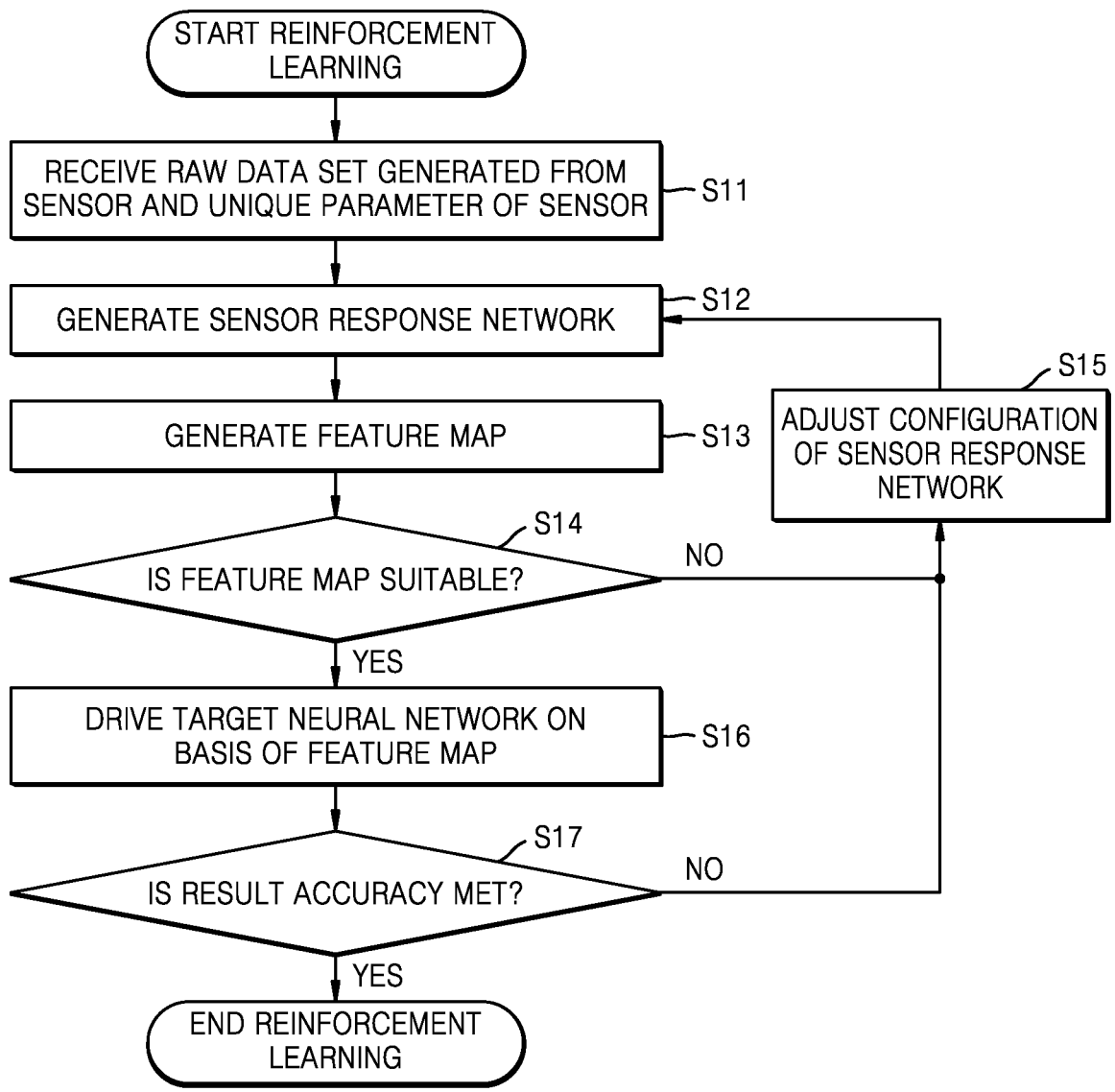
FIG. 9 is a flowchart showing an implementation example of a generation method of a sensor response network according to an exemplary embodiment of the inventive concept.

FIG. 9 is a flowchart showing an implementation example of a generation method of a sensor response network according to an exemplary embodiment of the inventive concept.

The method shown in FIG. 9 may be performed in the neural network device 100 of FIG. 1 or a training device (e.g., a server or the like). The description about FIG. 9 will be provided under the assumption that the reinforcement learning for generating the sensor response network is performed in the neural network device 100 of FIG. 1.

Referring to FIGS. 1 and 9, the neural network device 100 receives the raw data set generated from the sensor 200 and the unique parameters of the sensor 200 (operation S11). As described above, the raw data set is a set of raw data stored when the sensor 200 operates, is stored in a storage of the neural network system 1 to be provided to the neural network device 100, or is output from the sensor 200 in real time.

The neural network device 100 generates the sensor response network 20 (operation S12). The neural network device 100 may execute the agent 30 in FIG. 8 to generate the sensor response network 20 based on the raw data set (e.g., a sensing data set) and the unique parameters of the sensor 200. The agent 30 may also determine a cutoff point at which the sensor response network 20 is to be connected in the target neural network 10.

The neural network device 100 executes the sensor response network 20 to generate the feature map (operation S13). The agent 30 may determine the suitability of the generated feature map (operation S14). As described with reference to FIG. 8, the suitability of the feature map may be determined based on the difference (hereinafter, referred to as a feature map loss) between the generated feature map and the feature map generated in the training phase of the target neural network 10. When the feature map loss meets a preset condition, for example, when the feature map loss is equal to or smaller than a threshold, the feature map is determined to be suitable.

When the feature map is not determined to be suitable, the agent 30 may adjust the configuration of the sensor response network (operation S15). The agent 30 may adjust the configuration of the sensor response network 20 in a direction increases the reward increases. For example, the agent 30 may adjust the configuration based on set regulations or rules. Thereafter, operations S12 to S14 are repeatedly performed to generate (or update) the sensor response network 20 through the reinforcement learning.

Moreover, when the feature map is determined to be suitable, the target neural network 10 is driven on the basis of the feature map (operation S16). Alternatively, in an exemplary embodiment, operation S16 is performed after operation S15 is performed a preset number of times. For example, although not illustrated in FIG. 9, after the configuration has been adjusted the preset number of times, the method can resume to operation S16.

The neural network device 100, namely, the agent 30, may determine whether a required accuracy of the result from the target neural network 10 is met (operation S17). In an exemplary embodiment, the accuracy of the result is compared with a preset reference value, and when the accuracy of the result is equal to or greater than the preset reference value, it is determined that the required accuracy of the result is met. When the accuracy of the result is smaller than the reference value, in other words, the required accuracy of the result is not met, the agent 30 may perform the reinforcement learning by performing operation S15 and the succeeding operations.

In operation S17, when the required accuracy of the results is met, the reinforcement learning may be terminated. The neural network device 100 may drive the sensor response network 20 generated by the reinforcement learning to convert the raw data RD from the sensor 200 to the feature map, and drive the target neural network 10 on the basis of the feature map. For example, the neural network device 100 may input the feature map to a certain layer of the target neural network 10.

Figure 10:
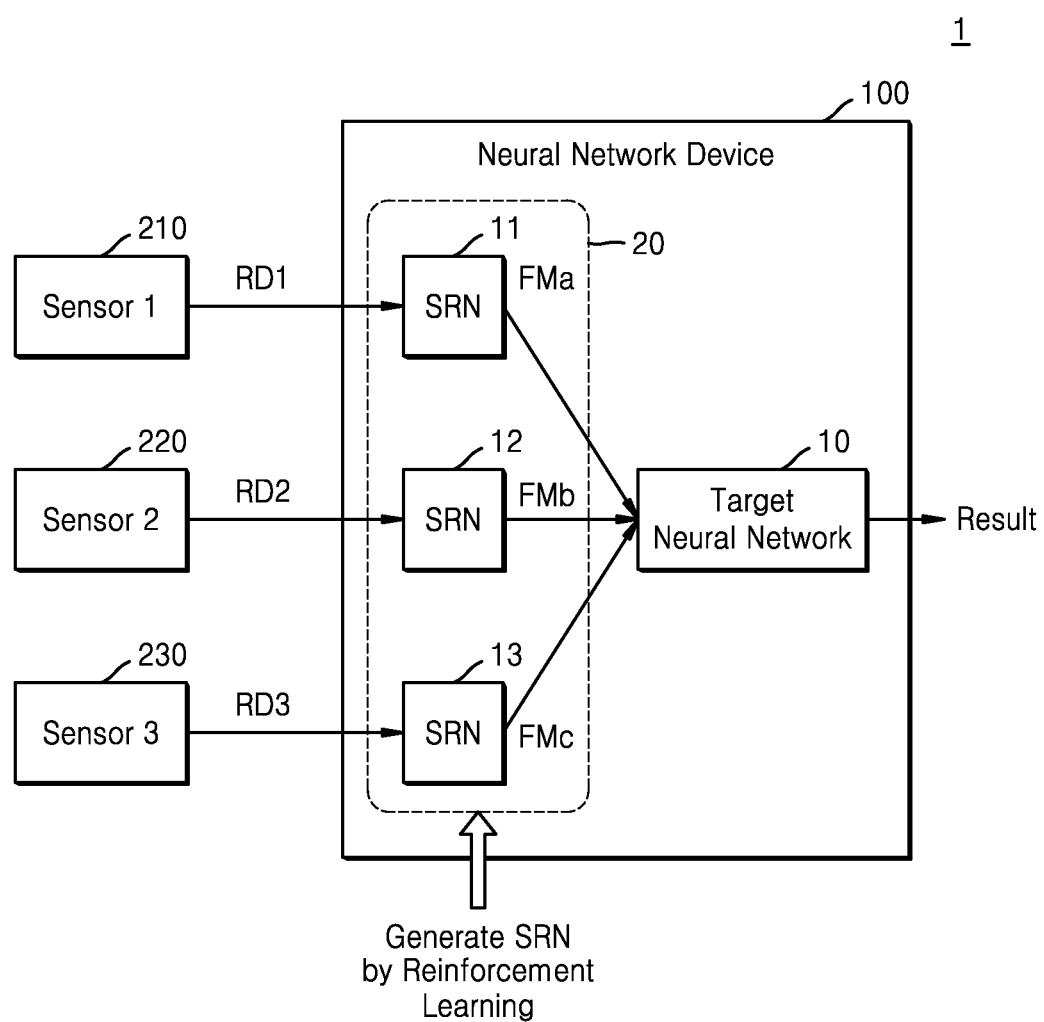
FIG. 10 explains an operation for each type of sensor in a neural network system according to an exemplary embodiment of the inventive concept.

FIG. 10 explains an operation for each type of a sensor in a neural network system according to an exemplary embodiment of the inventive concept.

Referring to FIG. 10, the neural network system 1 includes a neural network device 100, and at least one among a first sensor 210, a second sensor 220, and a third sensor 230.

When the first sensor 210 is provided in the neural network system 1, the reinforcement learning is performed on the basis of the sensor characteristics of the first sensor 210, namely, unique parameters and output data (i.e., a data pattern of the first raw data RD1) and thus the first sensor response network 11 may be generated. The neural network device 100 may drive the first sensor response network 11 to generate a first feature map FMa, and then provide the first feature map FMa to the target neural network 10.

When the second sensor 220 is provided in the neural network system 1, the reinforcement learning is performed on the basis of the sensor characteristics of the second sensor 220, and the second sensor response network 12 may be generated. When the third sensor 230 is provided in the neural network system 1, the reinforcement learning is performed on the basis of the sensor characteristics of the third sensor 230, and the third sensor response network 13 may be generated.

In this way, a sensor-adaptive reinforcement learning is performed, and thus, the first sensor response network 11, the second sensor response network 12, and the third sensor response network 13 respectively corresponding to the first to third sensors 210, 220, and 230 may be generated. The first sensor response network 11, the second sensor response network 12, and the third sensor response network 13 may have different characteristics.

When the first sensor 210 is mounted in the neural network system 1, the first sensor response network 11 generates a first feature map FMa on the basis of the first raw data RD1 from the first sensor 210. When the second sensor 220 is mounted in the neural network system 1, the second sensor response network 12 generates a second feature map FMb on the basis of the second raw data RD2 from the second sensor 220. When the third sensor 230 is mounted in the neural network system 1, the third sensor response network 13 generates a third feature map FMc on the basis of the third raw data RD3 from the third sensor 230. The first feature map FMa, the second feature map FMb, and the third feature map FMc may be different from each other, and layers of the target neural network 10, to which each of them is input, may also be different from each other.

In an exemplary embodiment of the inventive concept, the sensor response networks 11, 12 and 13 are changed according to the characteristics of the first, second, and third sensors 210, 220, and 230 included in the neural network system 1, but the target neural network 10 is not changed. In other words, even when the configuration of the sensor response networks 11, 12 and 13 is changed through the reinforcement learning, configuration parameters of the target neural network 10 are not changed. In this way, the sensor response networks 11, 12 and 13 may be changed on the basis of types or characteristics of the first, second, and third sensors 210, 220, and 230 through the reinforcement learning without a change in the target neural network 10 that was previously trained and applied, and thus, the accuracy of the target neural network 10 may be maintained without additional training of the target neural network 10.

Figure 11:
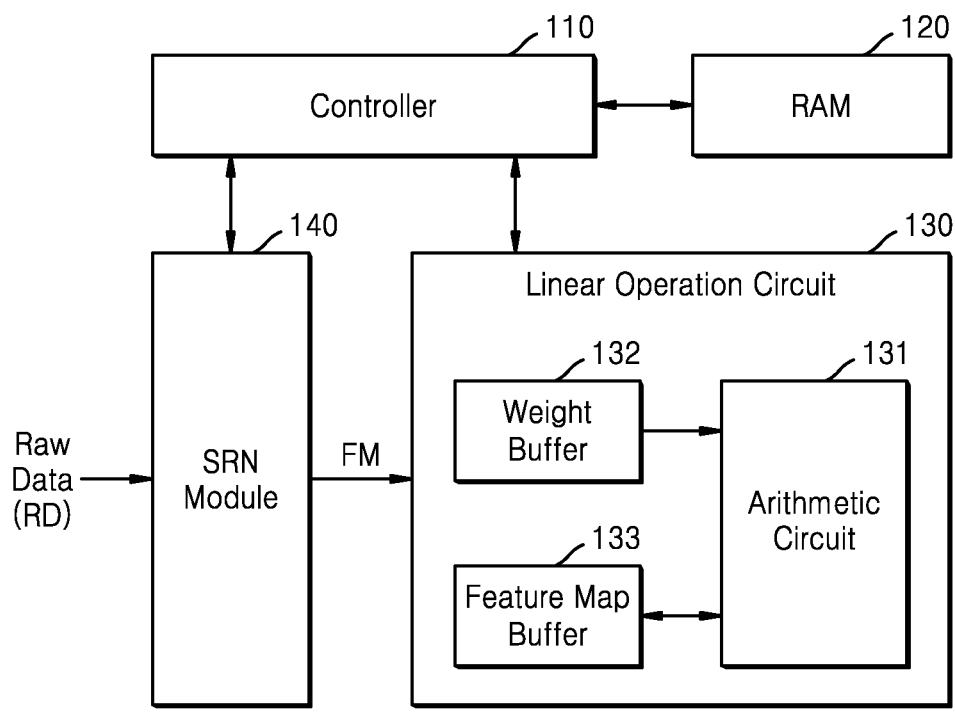
FIG. 11 is a block diagram showing an implementation example of a neural network device according to an exemplary embodiment of the inventive concept.

FIG. 11 is a block diagram showing an implementation example of a neural network device according to an exemplary embodiment of the inventive concept.

Referring to FIG. 11, a neural network device 100b includes a controller 110 (e.g., a control circuit), RAM 120, a linear operation circuit 130, and a sensor response network (SRN) module 140. The neural network device 100b of FIG. 11 is a modified example of the neural network device 100a of FIG. 6, and the difference between them will be mainly explained.

In FIG. 11, the neural network device 100b includes the SRM module 140, and the SRN module 140 may be implemented in hardware or software. The SRN module 140 may be implemented with a hardware logic or a processor for executing software stored in the RAM 120, for example, a microprocessor, a field programmable gate array (FPGA), or the like.

The SRN module 140 may convert raw data RD received from the sensor 200 (of FIG. 1) to a feature map FM. In the neural network device 100b, a separate SRN module 140 converts the raw data RD to the feature map FM, and thus, the processing speed of the neural network device 100b may be enhanced.

Figure 12:
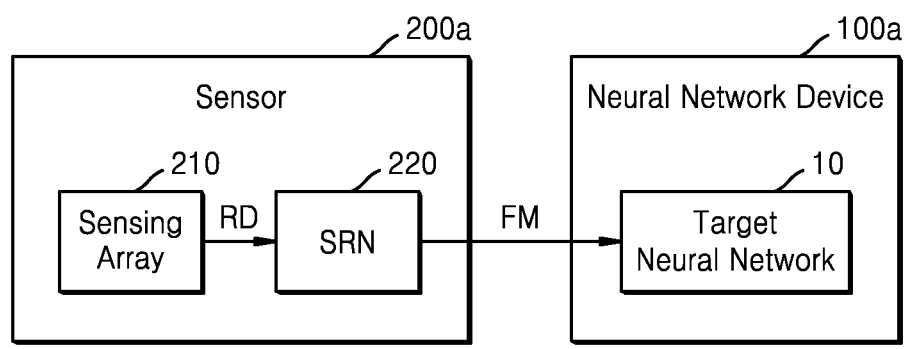
FIG. 12 is a block diagram showing a neural network system according to an exemplary embodiment of the inventive concept.

FIG. 12 is a block diagram showing a neural network system according to an exemplary embodiment of the inventive concept.

Referring to FIG. 12, a neural network system 1a includes a sensor 200a and a neural network device 100a. The sensor 200a includes a sensing array 210 and a sensor response network 220. In the present embodiment, the sensor response network 220 may be driven in the sensor 200a.

Raw data RD output from a sensing array 210 (and a reading circuit) of the sensor 200a may be converted to a feature map FM in the sensor response network 220, and the feature map FM may be output to the neural network device 100a. The neural network device 100a may drive the target neural network 10, and the feature map FM may be input, as an input feature map, to one of a plurality of hidden layers of the target neural network 10.

Moreover, the sensor response network 220 may be generated through reinforcement learning on the basis of the characteristics of the sensor 200a and the configuration of the target neural network 10 in a training device, for example, in a server.

Figure 13:
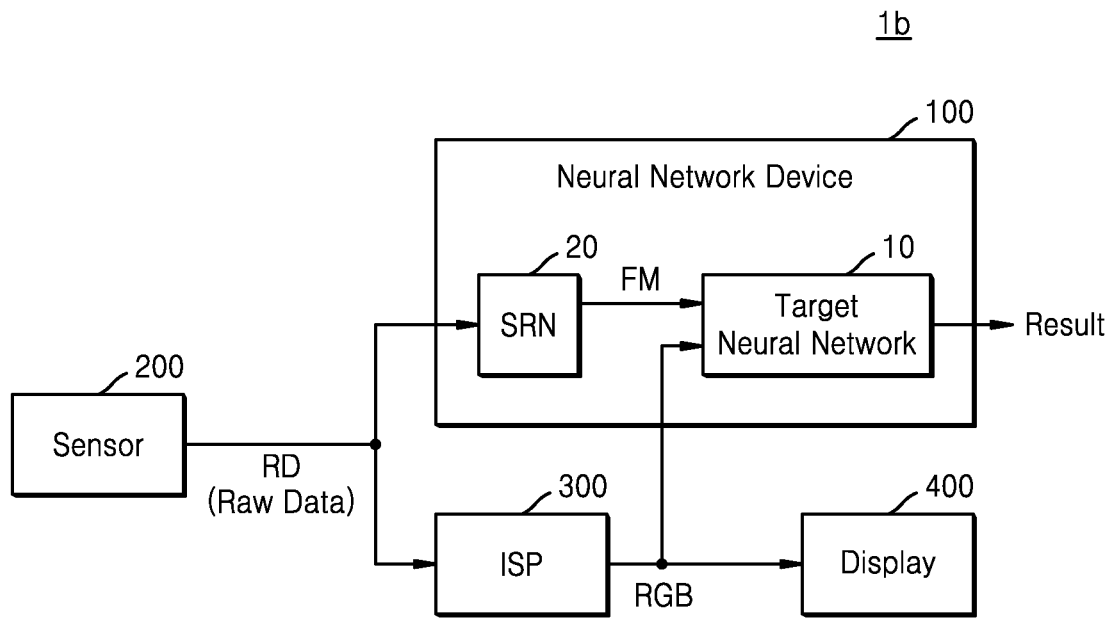
FIG. 13 is a block diagram showing a neural network device according to an exemplary embodiment of the inventive concept, and a neural network system including the same.
Figure 14:
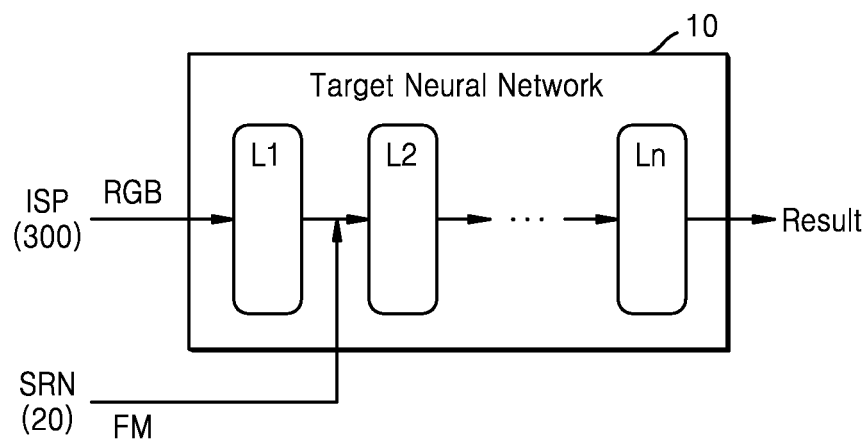
FIG. 14 shows an input to a target neural network of FIG. 13 in more detail.

FIG. 13 is a block diagram showing a neural network device according to an exemplary embodiment of the inventive concept, and a neural network system including the same, and FIG. 14 shows an input to a target neural network of FIG. 13 in more detail.

Referring to FIG. 13, the neural network system 1b includes a neural network device 100, a sensor 200, an image signal processor 300 (hereinafter, ISP), and a display 400 (e.g., a display device). The sensor 200 may be an image-related sensor including an image sensor or an infrared sensor, etc. In an exemplary embodiment, the sensor 200 is a charge-coupled device (CCD) image sensor or a complementary metal-oxide-semiconductor (CMOS) image sensor.

When an image derived from the raw data RD generated from the sensor 200 is to be displayed on the display 400, the ISP 300 converts the raw data RD to a data format (e.g., RGB data) suitable for the display 400. The display 400 may display RGB data received from the ISP 300. In addition, the neural network device 100 may drive the target neural network 10 with the RGB data taken as an input. Here, as illustrated in FIG. 14, the RGB data provided from the ISP 300 may be input to a first layer L1, for example, an input layer of the target neural network 10. For example, the first layer L1 may perform an operation for converting the input data to a feature map suitable for processing by the target neural network 10.

If an image derived from the raw data RD generated from the sensor 20 does not have to be displayed on the display 400, the raw data RD can be output to the SRN 20 instead of the ISP 300. For example, when the neural network system 1b is mounted in a smartphone, and a lock release is performed for the smartphone using face recognition of a user, the display may be in an off state, and an application using a neural network, for example, the target neural network 10 may be executed. Accordingly, the sensor 200 and the neural network device 100 except the ISP 300 and the display 400 may operate. The neural network device 100 may convert the raw data RD from the sensor 200 to a feature map FM using the sensor response network 20, and drive the target neural network 10 with the feature map FM taken as an input. Here, the feature map FM provided from the sensor response network SRN may be input to a hidden layer, for example, a second layer L2 of the target neural network 10.

In this way, when it is necessary for the output from the sensor 200 to be processed for display, the processed data, for example, RGB data generated by the ISP 300 is displayed, and the neural network device 100 drives the target neural network 10 on the basis of the processed data. When the output from the sensor 200 is not required to be processed for the display 400, the target neural network 10 is driven on the basis of the feature map FM generated using the sensor response network 20, and thus, the operation efficiency of the neural network system 1b may be enhanced. For example, FIG. 14 shows the RGB data generated by the ISP 300 can be output to a first layer L1 of the target neural network 10 when an image derivable from the RGB data needs to be presented on the display 400, and that a feature map FM generated by the SRN 20 can be output to a second layer L2 of the target neural network when the image does not need to be presented.

Figure 15:
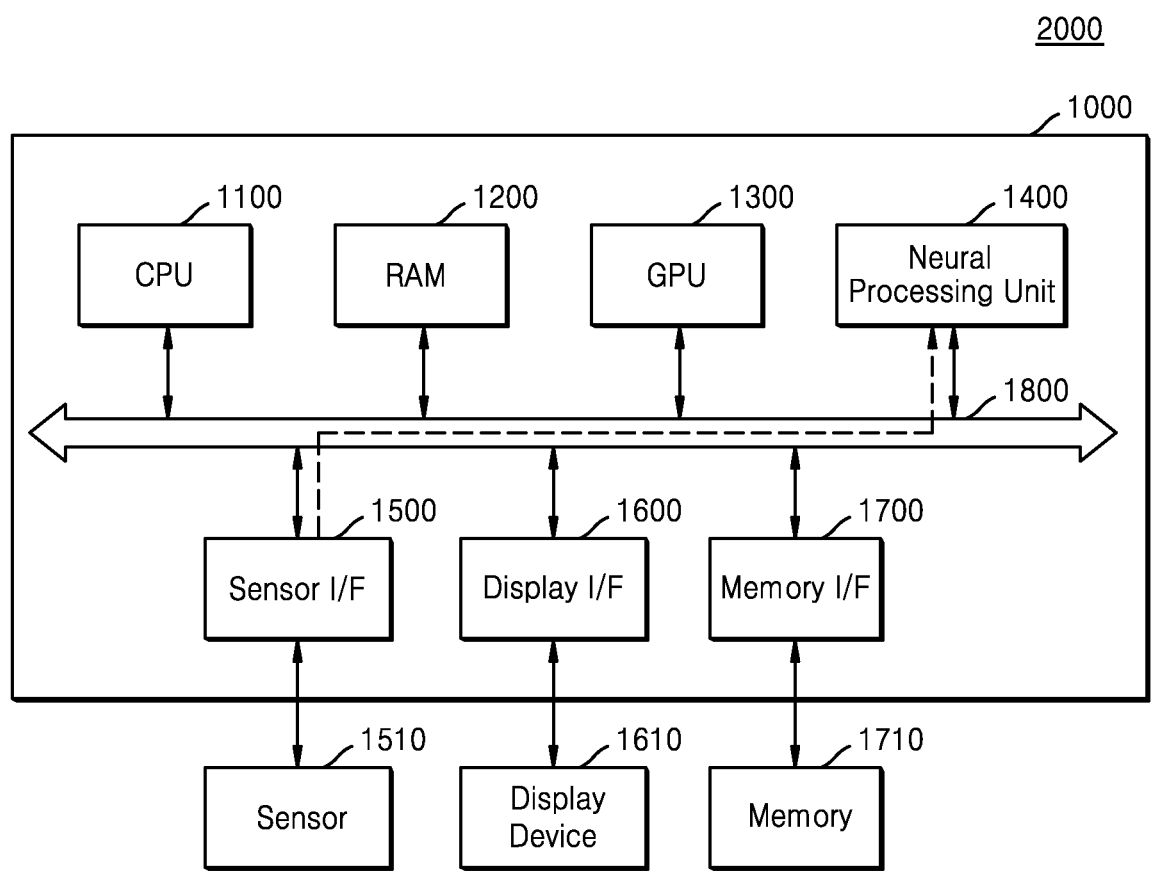
FIG. 15 is a block diagram showing an integrated circuit according to an exemplary embodiment of the inventive concept, and a device including the same.

FIG. 15 is a block diagram showing an integrated circuit according to according to an exemplary embodiment of the inventive concept, and a device including the same.

A device 2000 includes an integrated circuit 1000, and components connected to the integrated circuit 1000, for example, a sensor 1510, a display device 1610, and a memory 1710. The device 2000 may be a device for processing data on the basis of a neural network. For example, the device 2000 may be a mobile device including, a smartphone, a game device, or a wearable device, etc.

The integrated circuit 1000 according to an exemplary embodiment of the inventive concept includes a CPU 1100, RAM 1200, a GPU 1300, a neural processing unit 1400, a sensor interface 1500 (e.g., interface circuit), a display interface 1600 (e.g., interface circuit), and a memory interface 1700 (e.g., an interface circuit). Besides, the integrated circuit 1000 may further include general purpose components including a communication module, a digital signal processor (DSP), or a video module, etc. Further, each component (the CPU 1100, RAM 1200, GPU 1300, neural processing unit 1400, sensor interface 1500, display interface 1600, or the memory interface 1700) of the integrated circuit 1000 may transmit and receive data through a bus 1800. In an embodiment, the integrated circuit 1000 is an application processor. In an embodiment, the integrated circuit 1000 is implemented as a system on chip (SoC).

The CPU 1100 may control the entire operation of the integrated circuit 1000. The CPU 1100 may include a single core processor or a multi-core processor. The CPU 1100 may process or execute programs and/or data stored in the memory 1710. In an embodiment, the CPU 1100 may execute the programs stored in the memory 1710 to control functions of the neural processing unit 1400. For example, the programs could include programs to implement the SRN 20 and the target neural network 10 and update the SRN 20. In an exemplary embodiment, the neural processing unit executes a program to implement the SRN 20 and the target neural network 10, and update the SRN 20.

The RAM 1200 may temporarily store programs, data, and/or instructions. According to an embodiment, the RAM 1200 may be implemented with DRAM or SRAM. The RAM 1200 may temporarily store data, for example, image data, input and output through the interfaces 1500 and 1600 or data generated by the GPU 1300 or the CPU 1100.

In an embodiment, the integrated circuit 1000 further includes a read only memory (ROM). The ROM may store continuously used programs and/or data. The ROM may be implemented with an erasable programmable ROM (EPROM), electrically erasable programmable ROM (EEPROM), or the like.

The GPU 1300 may perform image processing of image data. For example, the GPU 1300 may perform image processing of image data received through the sensor interface 1500. The image data processed in the GPU 1300 may be stored in the memory 1710 or provided to the display device 1610 through the display interface 1600. The image data stored in the memory 1710 may be provided to the neural processing unit 1400.

The sensor interface 1500 may interface data (for example, image data, voice data, or the like) input from the sensor 1510 connected to the integrated circuit 1000. The sensor 1510 may be implemented by the sensor 200 of FIG. 1.

The display interface 1600 may interface with the display device 1610 to output data (for example, an image) to the display device 1610. The display device 1610 may output data of an image or a video to a display device 1610 such as a Liquid-crystal display (LCD), an active matrix organic light emitting diodes (AMOLED) display, or the like.

The memory interface 1700 may interface with the memory 1710 to exchange data with the memory 1710. The memory 1710 may be located outside the integrated circuit 1000. For example, data from the memory 1710 may be input to the memory interface 1710 or data of the integrated circuit 1000 may be output to the memory 1710. According to an embodiment, the memory 1710 may be implemented with a volatile memory including DRAM or SRAM, or a non-volatile memory including a resistive random-access memory (ReRAM), a phase-change random-access memory (PRAM), or a NAND flash, etc. The memory 1710 may also be implemented with a memory card (MMC, eMMC, SD, or micro SD) or the like.

The neural network device 100 explained with reference to FIGS. 1 to 14 may be applied as the neural processing unit 1400. The neural processing unit 1400 may receive the raw data from the sensor 1510 through the sensor interface 1500, drive the sensor response network generated through the reinforcement learning adaptive to the sensor 1510 to generate the feature map, and drive the target neural network on the basis of the feature map.

In an exemplary embodiment, the GPU 1300 operates as the ISP 300 of FIG. 13, and when the output of the sensor 1510 is to be displayed on the display device 1610, the GPU 1300 converts the raw data from the sensor 1510 to a data format suitable for display on the display device. For example, the GPU 1300 may convert the raw data to RGB data and provide the converted data to the display device 1610 through the display interface 1600. In addition, the GPU 1300 may provide the RGB data to the neural processing unit 1400, and the neural processing unit 1400 may drive the target neural network on the basis of the RGB data. When the output from the sensor 1510 is not required to be displayed on the display device 1610, the neural processing unit 1400 may convert the raw data from the sensor 1510 to the feature map using the sensor response network, and drive the target neural network on the basis of the feature map.

Figure 16:
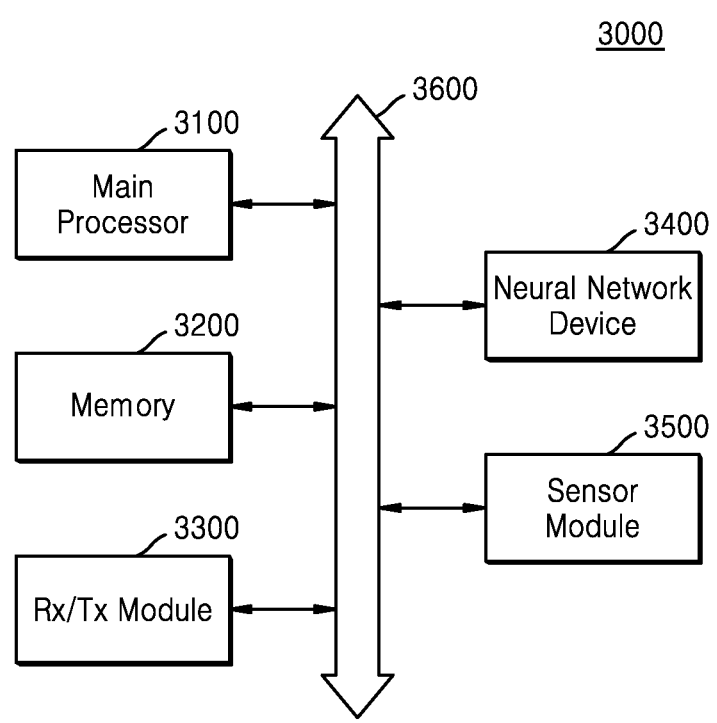
FIG. 16 is a block diagram showing a system including a neural network device according to an exemplary embodiment of the inventive concept.

FIG. 16 is a block diagram showing a system including a neural network device according to an exemplary embodiment of the inventive concept.

Referring to FIG. 16, the system 300 includes a main processor 3100, a memory 3200, a communication module 3300, a neural network device 3400, and a sensor module 3500. The components of the system 3000 may communicate with each other through a bus 3600.

The main processor 3100 may control the entire operation of the system 3000. For example, the main processor 3100 may be a CPU. The main processor 3100 may include a single core processor or a multi-core processor. The main processor 310 may process or execute programs and/or data stored in the memory 3200. For example, the main processor 3100 may execute the programs stored in the memory 3200 for controlling the neural network device 3400 to drive the neural network, for example, the target neural network and the sensor response network, and for controlling the neural network device 3400 to generate the sensor response network through the reinforcement learning.

The communication module 3300 may include various wired or wireless interfaces capable of communicating with an external device. The communication module 3300 may receive, from a server, a trained target neural network and a sensor response network generated through the reinforcement learning. The communication module 3300 may include a communication interface or the like connectable to a Local Area Network (LAN), a Wireless Local Area Network (WLAN) including Wireless Fidelity (Wi-Fi), a Wireless Personal Area Network (WPAN) including Bluetooth, a wireless Universal Serial Bus (USB), Zigbee, Near Field Communication (NFC), Radio-frequency identification (RFID), Power Line communication (PLC), or a mobile cellular network including 3rd Generation (3G), 4th Generation (4G), or Long Term Evolution (LTE), etc.

The sensor module 3500 may be implemented with at least one among various kinds of sensors. For example, the sensor module 3500 may include an image sensor configured to capture an image of an external environment to generate a video stream, and provide the video stream to the neural network device 3400.

The neural network device 3400 may perform a neural network operation on the basis of sensing data, for example, the video stream received through the sensor module 3500. The neural network device 100 described with reference to FIGS. 1 to 14 may be applied as the neural network device 3400. The neural network device 3400 may generate a feature map on the basis of the sensor response network, which has been trained to adaptive to a sensor of the sensor module 3500, from the raw data received from the sensor module 3500, not from the processed data and apply the feature map as an input to the hidden layer of the target neural network to drive the target neural network. Accordingly, a processing speed and the accuracy of the system 300 may be increased, and power consumption may be reduced.

Devices that include the neural network system 1 according to at least one exemplary embodiment of the inventive concept may include a processor, a memory for storing program data, a permanent storage including a disk drive, a communication port for communicating with external devices, and user interface devices, including a touch panel, keys, buttons, etc. Methods of the inventive concept discussed above may be implemented with software modules or algorithms and may be stored as program instructions or computer-readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer-readable recording medium may also be distributed over network coupled computer systems so that the computer-readable code is stored and executed in a distributive manner. This media can be read by the computer, stored in the memory, and executed by the processor.

At least one of the above-described embodiments may be described in terms of functional block components and various processing steps. Such functional blocks may be implemented by any number of hardware and/or software components configured to perform the specified functions. For example, these embodiments may employ various integrated circuit (IC) components, e.g., memory elements, processing elements, logic elements, look-up tables, and the like, which may carry out a variety of functions under the control of one or more microprocessors or other control devices. Similarly, where elements of the embodiments are implemented using software programming or software elements, the present embodiments may be implemented with any programming or scripting language including C, C++, Java, assembler language, or the like, with the various algorithms being implemented with any combination of data structures, objects, processes, routines or other programming elements. Functional aspects of the embodiments may be implemented in algorithms that are executed on one or more processors. Furthermore, the embodiments described herein may employ various techniques for electronics configuration, signal processing and/or control, data processing and the like.

While the inventive concept has been particularly shown and described with reference to embodiments thereof, it will be understood that various changes in form and details may be made therein without departing from the spirit and scope of the inventive concept.

What is claimed is:

1. An operation method of a neural network device comprising:
    determining whether an image-processing of converting new raw data into image data suitable for a display is required or not, wherein the new raw data being received from a sensor configured to sense light;
    when the image-processing is required,
        receiving, by an image signal processor, the new raw data to generate image data; and
        outputting, by the image signal processor, the image data to the display and to a target neural network,
    when the image-processing is not required,
        performing, by an agent, reinforcement learning using a parameter of the sensor and previous raw data output by the sensor to generate a sensor response network;
        receiving, by a neural network device, the new raw data;
        inputting, by the neural network device, the new raw data to the sensor response network for converting the new raw data to features suitable for a selected hidden layer among a plurality of hidden layers of the target neural network; and
        inputting, by the sensor response network, the features to the selected hidden layer of the target neural network to perform a computation based on the new raw data, wherein the performing of the reinforcement learning comprises:
applying the parameter and the previous raw data to the sensor response network to generate a first feature map;
applying the first feature map to the target neural network to generate a second feature map;
determining a loss of the first feature map;
determining a reward imparted by the second feature map and the loss;
adjusting the sensor response network to increase the reward; and
determining one of the plurality of hidden layers to input the features that increases an accuracy of the target neural network, as the selected hidden layer.

2. The operation method of claim 1, wherein the converting of the new raw data to the features comprises generating feature maps as many as a number of channels of the selected hidden layer based on the raw data.

3. The operation method of claim 1, wherein the target neural network is trained in advance on a basis of a sensing data set including the previous raw data, and a configuration of the target neural network is not changed in a process in which the sensor response network is adaptively trained to the sensor.

4. The operation method of claim 1, wherein the parameter comprises at least one among a pattern of the previous raw data generated from the sensor, physical characteristics of the sensor, and a type of the sensor.

5. The operation method of claim 4, wherein the sensor includes an image sensor, and the physical characteristics of the sensor comprise at least one among a focal length of a lens provided in the sensor, a degree of lens distortion, a pixel pitch of a sensing array provided in the sensor, and a dynamic range of the sensor.

6. The operation method of claim 1, wherein the reward indicates a suitability of the features for the target neural network or the accuracy of the target neural network.

7. The operation method of claim 1, wherein the reinforcement learning is performed as a background operation of the neural network device.

8. The operation method of claim 1, further comprising:
receiving processed data generated by processing the new raw data, wherein the sensor is an image sensor;
inputting the processed data to an input layer of the target neural network; and
driving the neural network using the processed data.

9. The operation method of claim 8, wherein the receiving of the new raw data and the receiving of the processed data are selectively performed on a basis of whether the processed data is to be presented on the display.

10. The operation method of claim 1, wherein the target neural network comprises a neural network trained to classify input data into one of a plurality of classes.

11. The operation method of claim 1, wherein it is determined that the image is not to be displayed when the display is in an off state and it is determined that the image is to be displayed when the display is not in the off state.

12. A neural network system comprising:
a display;
an image signal processor;
a memory configured to store an agent, a sensor response network, and a target neural network; and
a neural network device,
wherein the neural network system determines whether an image-process of converting new raw data into image data suitable for a display is required or not, wherein the new raw data being received from a sensor configured to sense light,
when the image-processing is required, the image signal processor operates on the new raw data to generate image data and outputs the image data to the display and the target neural network,
when the image-processing is not required,
the neural network device executes the agent to perform reinforcement learning using a parameter of the sensor and previous raw data output by the sensor to generate the sensor response network, receives the new raw data, inputs the new raw data to the sensor response network to convert the new raw data to a feature map suitable for a selected hidden layer among a plurality of layers of the target neural network, and
the sensor response network inputs the features to the selected hidden layer of the target neural network to perform a computation based on the new raw data,
wherein the reinforcement learning is performed by:
applying the parameter and the previous raw data to the sensor response network to generate a first feature map;
applying the first feature map to the target neural network to generate a second feature map;
determining a loss of the first feature map;
determining a reward imparted by the second feature map and the loss;
adjusting the sensor response network to increase the reward; and
determining one of the plurality of hidden layers to input the features that increases an accuracy of the target neural network, as the selected hidden layer.

13. The neural network system of claim 12, wherein the reward is a suitability of the feature map for the target neural network or the accuracy.

14. The neural network system of claim 12, wherein parameters of the target neural network are stored in the memory.

15. The neural network system of claim 12, wherein, when the reinforcement learning is performed, the neural network device converts processed data generated on a basis of the previous raw data to a data format suitable for an input layer among the plurality of layers of the target neural network and performs operations of the target neural network on a basis of the data format.

16. The neural network system of claim 12, wherein the neural network device comprises an arithmetic circuit comprising processing units configured to operate in parallel.

17. A neural network system comprising:
a display device;
an image sensor configured to generate a Bayer pattern on a basis of a received optical signal;
an image signal processor configured to convert the Bayer pattern received from the image sensor to red-green-blue (RGB) data, output the RGB data to the display device and output the RGB data to an input layer of a target neural network; and
a neural network device includes a sensor response network and the target neural network,
wherein,
when an image-processing of converting the Bayer pattern into the RGB data suitable for the display device is required, the Bayer pattern is applied to the image signal processor, and when the image-processing is not required, the Bayer pattern is input to the sensor response network and an output of the sensor response network is applied to a selected hidden layer of the target neural network among the plurality of hidden layers to perform a computation based on the Bayer pattern, wherein the sensor response network is generated through reinforcement learning by:

applying a parameter of the sensor and the Bayer pattern to the sensor response network to generate a first feature map;

applying the first feature map to the target neural network to generate a second feature map;

determining a loss of the first feature map; and determining a reward imparted by the second feature map and the loss;

adjusting the sensor response network to increase the reward; and determining one of the plurality of hidden layers to input the output of the sensor response network that increases an accuracy of the target neural network, as the selected hidden layer.

18. The neural network system of claim 17, wherein the sensor response network is generated by performing reinforcement learning using a parameter of the image sensor and a previous Bayer pattern output by the image sensor.

* * * * *